United States Patent
Pleskot

(10) Patent No.: US 9,539,919 B2
(45) Date of Patent: Jan. 10, 2017

(54) ADJUSTING DEVICE FOR ADJUSTING A MOTOR VEHICLE SEAT, MOTOR VEHICLE SEAT, MOTOR VEHICLE AND METHOD FOR ADJUSTING A MOTOR VEHICLE SEAT

(71) Applicant: GM GLOBAL TECHNOLOGY OPERATIONS LLC, Detroit, MI (US)

(72) Inventor: Andrzej Pleskot, Trebur (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 438 days.

(21) Appl. No.: 13/747,690

(22) Filed: Jan. 23, 2013

(65) Prior Publication Data
US 2013/0193733 A1    Aug. 1, 2013

(30) Foreign Application Priority Data

Jan. 25, 2012  (DE) .................. 10 2012 001 276

(51) Int. Cl.
*B60N 2/22* (2006.01)
*B60N 2/02* (2006.01)
*B60N 2/235* (2006.01)

(52) U.S. Cl.
CPC . *B60N 2/22* (2013.01); *B60N 2/02* (2013.01); *B60N 2/2356* (2013.01)

(58) Field of Classification Search
CPC .............. B60N 2/2356; B60N 2002/4475; B60N 2/02; B60N 2/22; F16C 1/18; F16C 1/223
USPC ........... 297/378.12, 463.1, 354.12; 74/502.2, 74/501.6
See application file for complete search history.

(56) References Cited

U.S. PATENT DOCUMENTS

| | | | |
|---|---|---|---|
| 3,730,019 A * | 5/1973 | Ballard | 74/502 |
| 4,830,433 A | 5/1989 | Takahashi | |
| 5,131,717 A * | 7/1992 | Kaminiski et al. | 297/316 |
| 5,277,080 A * | 1/1994 | Roelle | 74/501.5 R |
| 5,595,420 A * | 1/1997 | Rogers | 297/85 C |
| 5,681,005 A * | 10/1997 | Ligon et al. | 242/394.1 |
| 5,823,626 A * | 10/1998 | Haas | 297/448.2 |
| 6,009,770 A | 1/2000 | Och | |
| 6,349,449 B1 * | 2/2002 | Kuehl | 16/342 |
| 6,957,596 B2 * | 10/2005 | Kopetzky | B60N 2/66 188/17 |
| 7,093,902 B2 | 8/2006 | Lehmann et al. | |
| 7,303,236 B2 * | 12/2007 | Ritter et al. | 297/344.11 |

(Continued)

FOREIGN PATENT DOCUMENTS

| | | | | |
|---|---|---|---|---|
| DE | 19904005 C1 | 5/2000 | | |
| GB | 2044607 A * | 10/1980 | ............... | B60N 1/06 |
| JP | 2009120141 A | 6/2009 | | |

OTHER PUBLICATIONS

Great Britain Patent Office, Great Britain Search Report for Great Britain Application No. GB1301027.7, dated May 15, 2013.

*Primary Examiner* — David R Dunn
*Assistant Examiner* — Tania Abraham
(74) *Attorney, Agent, or Firm* — Lorenz & Kopf LLP

(57) ABSTRACT

An adjusting device for adjusting a motor vehicle seat is provided. The adjusting device includes an engagement fitting unit, a force transmission device configured to transmit a force for locking and unlocking the engagement fitting unit, and a force step-up transmission device configured to step up the force transmitted by the force transmission device. A motor vehicle seat, a motor vehicle, and a method for adjusting a motor vehicle seat using the adjusting device are also provided.

15 Claims, 2 Drawing Sheets

(56) References Cited

U.S. PATENT DOCUMENTS

| | | |
|---|---|---|
| 7,472,963 B2 * | 1/2009 | Jeong ..................... 297/463.1 |
| 2005/0236880 A1 * | 10/2005 | Kojima .................. 297/354.1 |
| 2006/0255637 A1 * | 11/2006 | O'Connor .......... B60N 2/01583 |
| | | 297/331 |
| 2008/0224520 A1 * | 9/2008 | Veluswamy et al. ......... 297/335 |
| 2009/0026825 A1 * | 1/2009 | Ishijima et al. .............. 297/358 |
| 2009/0058158 A1 * | 3/2009 | Sobieski ..................... 297/338 |

* cited by examiner

ADJUSTING DEVICE FOR ADJUSTING A MOTOR VEHICLE SEAT, MOTOR VEHICLE SEAT, MOTOR VEHICLE AND METHOD FOR ADJUSTING A MOTOR VEHICLE SEAT

CROSS-REFERENCE TO RELATED APPLICATION

This application claims priority to German Patent Application No. 10 2012 001 276.4, filed Jan. 25, 2012, which is incorporated herein by reference in its entirety.

TECHNICAL FIELD

The technical field relates to an adjusting device for adjusting a motor vehicle seat, a motor vehicle seat including the adjusting device, a motor vehicle including the vehicle seat, and a method for adjusting a motor vehicle seat using the adjusting device.

BACKGROUND

From the prior art, motor vehicles having seats are known, with which the position of the backrest, in particular with respect to a seat part, can be adjustable. The adjustment is effected via a lever mechanism arranged on the seat or another actuating device fixed there. Here, stepless adjustments by means of actuators and discontinuous adjustment, i.e. step-by-step adjustment by means of mechanical solutions are known. With the mechanical adjustments, locking or arresting devices for locking or for arresting have to be released or arrested for adjusting. This is effected via a lever, via which a force is transmitted to an engagement fitting. A force transmission in this case takes place proportionally, i.e., a force to be transmitted increases with the lever distance or in the case of a pivot movement, the torque increases with the twisting angle. Because of intermediate positions of the engagement fittings, adjusting is possible even with an engagement fitting not fully unlocked. In the case of adjusting in intermediate positions, undesirable side effects such as noise development during adjusting or increased wear occur.

From DE 38 00 924 C2 a vehicle seat having an adjusting device for a backrest is known. The adjusting device consists of a fixed-location bearing pedestal and a pivot arm pivotably mounted on the bearing pedestal, which is fastened to the backrest and can be fixed in selectable angular positions by means of a locking device. The adjusting device is covered by a covering part in the direction of the seat user. The bearing pedestal is fastened to the seat part and the remaining parts of the adjusting device are arranged within the backrest and connected with the latter. The covering part is connected with the latter. The covering part is connected to a part of the adjusting device in a fixed manner and comprises a slit into which a region of the bearing pedestal projecting upwards dips when the backrest is folded forward.

The actuating device for the known adjusting device is directly arranged on the seat to be adjusted. The arrangement of the actuation is relatively un-ergonomical and accessible only with difficulty in cramped conditions. In addition, an adjusting characteristic of the adjusting device is unfavourable for the user.

It is therefore at least one object herein to provide a solution which provides a simpler and more comfortable adjusting possibility. It is at least one object herein, in particular, to provide a motor vehicle, a motor vehicle seat, an adjusting device and a method thereto, with which the operating comfort for adjusting a seat is improved. In addition, other objects, desirable features and characteristics will become apparent from the subsequent summary and detailed description, and the appended claims, taken in conjunction with the accompanying drawings and this background.

SUMMARY

An adjusting device for adjusting a motor vehicle seat is provided. In an exemplary embodiment, a discontinuous adjusting device for adjusting a backrest position of the motor vehicle seat is provided. The adjusting device includes a force transmission device with which a force for locking and unlocking an engagement fitting unit of the adjusting device can be transmitted to the engagement fitting unit. A force step-up transmission device is provided with which the force to be transmitted by the force transmission device can be stepped up during the force transmission, for example stepped up variably. Adjusting a backrest is effected by applying force to the backrest. In one embodiment, the backrest is preloaded so that a preload force acts in the direction of an upright seat position and against a pivoted-back position. In order to pivot the backrest, a force is preferably exerted by a user sitting on the seat, for example by leaning against the backrest. To prevent an unintentional adjustment of the backrest, the adjusting device comprises a blocking or arresting device, which prevents the unintentional adjusting. In an embodiment, the arresting device is configured as an engagement fitting unit, with which two engagement fitting parts act with each other. These have to be unlocked for adjusting, so that a seat adjustment can take place. The adjusting device comprises the engagement fitting unit. When locked, the two engagement fitting parts are engaged. To make adjusting possible, the engagement fitting parts are moved apart, so that these are no longer engaged. The force or the movement required for this is transmitted via the force transmission device. During the relative movement of the two engagement fitting parts, there are different intermediate positions between the two end positions or end states—locking and releasing—during the moving apart. With some of these intermediate positions, adjusting is possible although the engagement fitting parts are still slightly engaged. In order to move the engagement fitting parts apart, the force transmission device is provided, with which a force for locking and unlocking can be transmitted at least to the engagement fitting unit. Accordingly, the force in this case results in a relative movement of the engagement fitting parts. In order to employ a force, which is transmitted to the engagement fitting unit via the force transmission device so that adjusting takes place only when the engagement fitting parts have moved completely apart, a force step-up transmission device is provided. The force transmission device is configured to carry out the state in which the engagement fitting parts are completely removed from each other and adjusting is to be carried out without contact of the engagement fitting parts, faster and with a perceptible feedback to the operator. To this end, the force to be transmitted, which with the prior art is transmitted substantially proportionally or linearly to the distance, is stepped up by the force transmission device, in particular variably stepped up. In an embodiment, the stepping-up takes place degressively, so that on reaching a decoupling point, i.e. a point or state in which the engagement fitting parts are completely no longer engaged, perceptibly less force has to be exerted on the force transmission device, i.e. a corresponding feedback to the operator is provided. Here, the adjusting device is configured so that the force transmission device becomes easier to operate when the decoupling point or a decoupling state is reached. In an embodiment, a force transmission device is provided. In other embodiments, a plurality of force transmission devices is provided, for example two, three or more. The plurality of force transmission devices is coupled in an embodiment, for example connected in series or in parallel. A further embodiment provides a force step-up transmission device. Another embodiment provides a plurality of force step-up transmission devices. The plurality of force step-up transmission devices are coupled in an embodiment, for example connected in series or in parallel. In an embodiment, the force transmission device is configured as a lever, gearing or the like, i.e. the force transmission device comprises a step-up portion, with which a force is stepped up. However, the force is stepped up independently of an angle or a distance of the force transmission device, so that a predetermined transmission ratio is always present. The force step-up transmission device provides an additional transmission ratio. In particular, the force step-up transmission device is configured such that different transmission ratios can be realized. To this end, the force step-up transmission device can be varied relative to the force transmission device, in particular movably, for example translatorically and/or rotatorically movably.

In an embodiment the adjusting device is configured as a remote-controlled adjusting device. Preferably, the adjusting device is at least partially arranged on an easily accessible point that is distant from a seat or a backrest. Preferably, the remote-controlled adjusting device is arranged easily accessible to a user sitting on the seat, in particular within reach. For a remote-controlled embodiment the force transmission device comprises a part that is close to the engagement fitting and a part that is distant from the engagement fitting. The part that is distant from the engagement fitting forms the remotely controllable part of the force transmission device. The two parts of the force transmission device are suitably coupled for a force transmission.

In another embodiment, the adjusting device includes a force bridging device in order to transmit a remotely exerted force from at least one part of the force transmission device that is distant or distant from the engagement fitting to at least one part or the force transmission device that is near the engagement fitting. The force transmission device comprises a part that is near the engagement fitting, with which a force is transmitted to the engagement fitting unit. For a remotely controlled embodiment, a force transmission part that is distant from the engagement fitting is provided. The latter can be attached at any point spaced from the part that is close to the engagement fitting. In order to make it possible that the force can be transmitted from the part that is distant from the engagement fitting to the part that is near the engagement fitting and ultimately to the engagement fitting unit, a force bridging device is provided. This bridging device connects the parts of the force transmission device. For example, the force bridging device is designed as control cable or the like.

In yet another embodiment it is provided that the force transmission device comprises a lever unit that is rotatable about a rotation axis, with which the force can be transmitted. Preferably, at least two lever units that can rotate about a rotation axis are provided, one close to the engagement fitting and one distant from the engagement fitting. By way of a twisting movement, a torque can be transmitted to the engagement fitting unit. The embodiment as rotatable lever unit requires little space and is small in construction. The rotatable lever units are preferably connected to the control cable. In this way, a remotely generated torque can be easily transmitted to the engagement fitting unit via the control cable. The force distance is space-savingly brought about via a twisting about a twisting angle.

In a further embodiment it is provided that the force step-up transmission device comprises a step-up transmission unit movably arranged on the force transmission device. Preferably, at least one force step-up transmission device is provided. In another embodiment, a plurality of force step-up transmission devices are provided, for example two, there, four or more force step-up transmission devices. In an embodiment, the plurality of force step-up transmission devices is connected in series and/or in parallel, so that a corresponding force step-up transmission and/or distribution can be carried out. In order to carry out an additional force step-up transmission to the force transmission, the force step-up transmission device is arranged movable relative to the force transmission device. Because of this, a variation of the force to be transmitted can be realized. In particular, a degressive force-distance curve during a force transmission can be realized. The step-up transmission unit is for example configured as a lever unit or a pivot lever, in order to realize a force step-up transmission in a small space. Here, the step-up transmission unit is movably formed on the force transmission device. Upon a movement of the force transmission device, an additional step-up transmission is realized through a relative movement of the step-up transmission unit. In one embodiment, the step-up transmission unit is configured as a lever unit or a pivot lever, which can be rotated about a rotation axis. The rotation axis is formed on the force transmission device.

In a further embodiment it is provided that the force bridging device is coupled to a force step-up transmission device coupled to the force transmission device. In an embodiment, the force bridging device is directly coupled to at least one force transmission device. In another embodiment, the force transmission device is indirectly coupled to at least one force transmission device, for example via a force step-up transmission device arranged on the force transmission device. In the case of an indirect connection, a step-up transmission ratio can be varied. Because of this, a force-distance curve can be realized, which is configured non-linear and/or non-proportional, but for example degressive or progressive. Here, the components can be configured so that at the time of the decoupling of the engagement fitting parts, a force-distance curve performs a kink towards the bottom, i.e. a force to be generated for a further movement of the force transmission device becomes smaller and/or the force transmission device imparts the feeling of being easier to operate. In an embodiment, the force bridging device is coupled near the engagement fitting to a force transmission device configured as a rotatable lever. The connection to the force transmission device that is distant from the engagement fitting, by contrast, takes place indirectly via the force step-up transmission device. In an embodiment, the step-up transmission unit is coupled to the force bridging device. For example, a wire of a control cable is wound about the lever-like step-up transmission unit, so that upon a pivot movement a force and/or movement transmission is carried out. A further embodiment provides that the force step-up transmission device comprises control elements, which control a movement of the force transmission unit and the force step-up transmission device. The control elements preferably form a control curve, along which the movable force step-up transmission device and/or the force transmission device, move(s). The movement of the force step-up transmission device in this case has two components: the component based on the movement of the force transmission device and the component of the own movement based on the movable mounting. In order for these movements not to take place randomly, the control elements are provided. The control elements comprise for example guide surfaces, stops, molded-on portions, grooves, jump sections, rotation limiters, spring elements, magnets and the like. Furthermore, an embodiment provides that the force step-up transmission device is rotatably arranged eccentrically to the rotation axis of the force transmission device. In this way, a certain step-up transmission ratio can be realized and/or adjust because of the eccentricity. Because of this, the adjusting device has an additional lever arm to the force transmission unit. By way of the distance of the rotation axis of the force transmission device and the rotation axis of the force step-up transmission device, a force-distance curve can be adjusted.

An embodiment provides, in particular, that the force step-up transmission device forms a control cam and the control elements form a control curve for the control cam, along which the cam can be guided. In this way, a force-distance curve can be determined with great precision. The control curve can be designed as continuous control curve. In another embodiment, the control curve is designed as interrupted control curve.

Furthermore, an embodiment provides that the part of the force transmission device that is close to the engagement fitting comprises a lever unit that is rotatable about a rotation axis, with which the force can be transmitted to the engagement fitting unit. The embodiment as a rotatable lever unit is small in construction. In an embodiment, the rotatable lever unit comprises a drum or winding portion, about which a wire of the force bridging device can be wound or wrapped. In another embodiment, the force bridging device is configured as a control cable. Accordingly, a force is transmitted via a wire or another flexible material of high tensile strength. In a further embodiment, this wire is wound about the drum portion, in order to realize a suitable coupling to the rotatable lever close to the engagement fitting. The drum portion preferably does not have a constant radius, but varies in its distance to its rotation axis.

Furthermore, in an embodiment, a motor vehicle seat, in particular a motor vehicle seat having a backrest that is adjustable relative to a seat part, has an adjusting mechanism for adjusting the backrest. The adjusting mechanism is configured as the adjusting device described above. In an embodiment, the motor vehicle seat is configured as individual seat. In another embodiment, the motor vehicle seat is a bench seat. In an embodiment, the bench seat has a split backrest, which can be adjusted individually and/or jointly via the adjusting device described above. A part of the force transmission device that is close to the engagement fitting is formed on the motor vehicle seat. The part of the force transmission device that is distant from the engagement fitting is arranged spaced from the motor vehicle seat, for example in a front region of the motor vehicle or in a door region.

Furthermore, in an embodiment, a motor vehicle, in particular a passenger motor vehicle, has a seat unit for a vehicle occupant. The seat unit is configured as the motor vehicle seat as described above. The motor vehicle is for example a sedan, van, coupe, off-road vehicle, (mini) bus or the like.

In yet another embodiment, a method for adjusting a motor vehicle seat the adjusting device, in particular for adjusting a backrest position of the motor vehicle seat, using the discontinuous adjusting device described above, is provided. The method includes transmitting a force for locking and unlocking an engagement fitting unit of the adjusting device to the engagement fitting unit by means of a force transmission device. The transmitting includes stepping-up, in particular variable stepping-up, in the meantime of the force to be transmitted by the force transmission device. The transmitting is effected partly via levers, which have fixed force-distance characteristics and with which a force transmission takes place dependent on a distance according to a fixed force-distance curve. In order to configure a timing of a complete decoupling of the engagement fitting unit clearly perceptibly for an operator, it is provided, at least in the meantime, to step-up the force transmission so that a change in a force-distance curve occurs. It is provided, in particular that the force to be generated for releasing the adjusting device diminishes perceptibly at the time of the complete decoupling of the engagement fitting parts. Accordingly, the stepping-up transmission is carried out so that a resistance diminishes perceptibly as soon as the decoupling time is reached.

An embodiment, therefore, provides in particular that the stepping-up comprises at least partially a degressive stepping-up. Because of this, a linear force-distance curve or a rising force-distance curve comprises a descending curve upon commencement of the degressive stepping-up.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
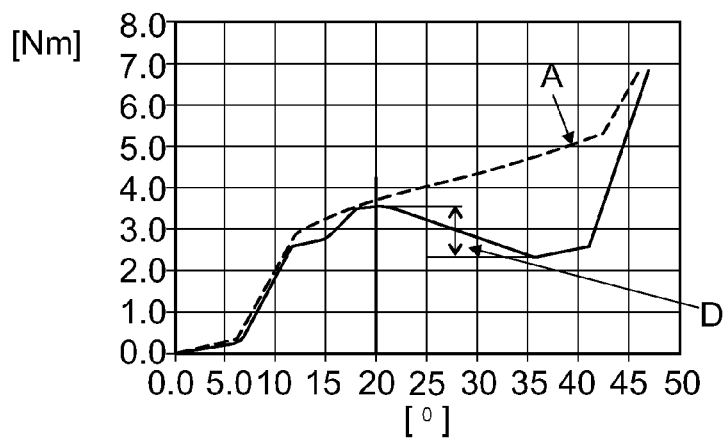
FIG. 1 is a graph of a force-distance curve of an adjusting device in accordance with an exemplary embodiment.
Figure 2A:
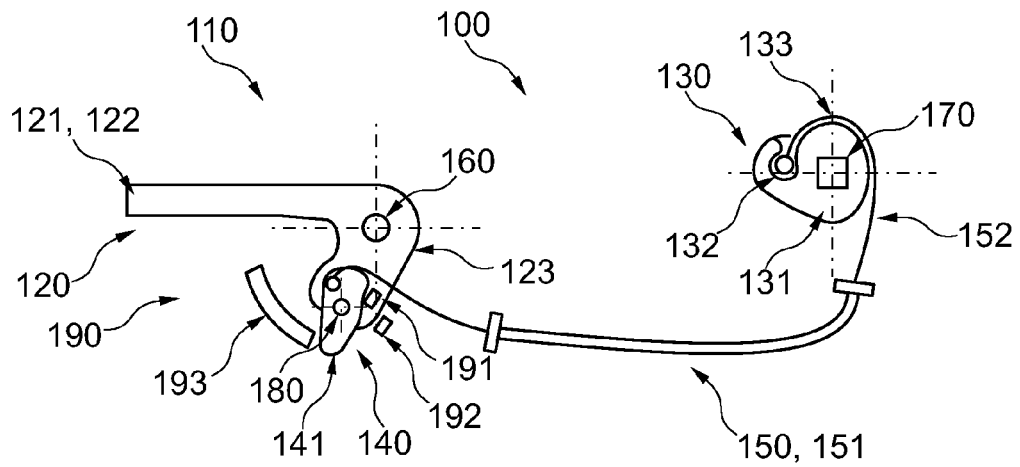
FIG. 2a is schematic diagram of the adjusting device in a first position, in accordance with an exemplary embodiment.
Figure 2B:
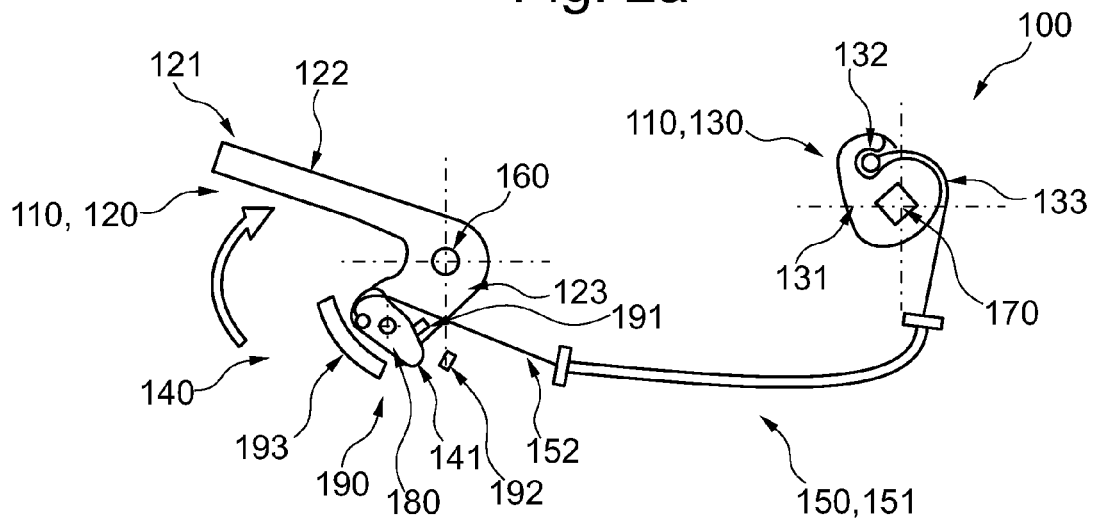
FIG. 2b is a schematic diagram of the adjusting device in another position, in accordance with an exemplary embodiment.

FIG. 1 is a graph of a force-distance curve of an adjusting device 100, illustrated in FIGS. 2a and 2b. This force-distance curve characterizes a torque characteristic of an engagement fitting unit actuation. This is measured in an installed state, i.e. on the seat to be adjusted. Here, a force-distance curve according to the prior art is drawn in at A as an interrupted line for improved comparison. The graph shows on the abscissa the distance that has to be generated for adjusting upon actuating the adjusting device 100, here in the form of a twisting angle with the unit degree. On the ordinate, the force to be generated over the distance is plotted, here as torque with the unit Nm. The abscissa is divided into 5° steps with an auxiliary grid. The ordinate is divided into 1-Nm steps. For adjusting a backrest, the adjusting device is actuated via a force transmission device, here in the form of a lever rotatably mounted about a rotation axis. Up to a twisting angle of approximately 6-7°, the twisting of the lever takes place almost without any force expenditure or in this case one that rises slightly up to approximately 0.4 Nm. The force curve over the distance is linearly rising. At approximately 6-7°, a kink occurs in the force-distance curve and the curve rises more sharply up to approximately 12° to approximately 2.5-3 Nm, in particular substantially linearly. The force transmission to the engagement fitting unit takes place here, wherein the engagement fitting parts are separated from each other. At approximately 12° to approximately 20°, the force increase to approximately 3.5 Nm takes place slightly flatter than before. The engagement fitting parts move away from each other and are less and less in mutual engagement. At approximately 20°, the engagement fitting parts are completely no longer engaged, which constitutes the timing or the point of an optimal adjusting. From here, the force-distance curves that ran substantially similar up to that point, run differently according to the adjusting device 100 that is different here and according to an adjusting device according to the prior art. While with the adjusting device according to the prior art the force-distance curve continues to rise evenly approximately linearly, the force-distance curve performs a kink downwards, i.e. the force over the distance drops to approximately 2.3 Nm up to approximately 35°. This drop is marked with D. Only from approximately 35° does the curve begin to rise initially slowly—up to approximately 42°, then steeply up to approximately 47° to approximately 7 Nm, where it runs approximately like the curve A according to the prior art. The force decline D is clearly perceptible to the user. As soon as this force decline D is perceptible, the user can adjust the backrest without problem. The structure shown in FIGS. 2a to 4 is suitable for realizing this force-distance curve or the force-distance characteristic of the adjusting device.

The FIGS. 2a to 4 show an exemplary embodiment of an adjusting device 100. Same or similar components are marked with the same reference characters. A comprehensive description of already described components is omitted for the sake of better clarity.

FIG. 2a schematically shows the adjusting device 100 in a first position, in which the adjusting device 100 is blocked. This means, the engagement fitting unit which is not shown here is blocked and its engagement fitting parts are completely engaged. In an embodiment, the adjusting device 100 comprises a force transmission device 110, which comprises a first force transmission part 120 and a second force transmission part 130. The first force transmission part 120 is configured as force transmission part 120 that is distant from the engagement fitting and thus constitutes the remotely controlled part of the force transmission device 110. Accordingly, the second force transmission part 130 is the force transmission part 130 that is close to the engagement fitting, which is arranged directly or adjacently on the engagement fitting unit and interacts with the latter. In another embodiment, the adjusting device 100 comprises a force step-up transmission device 140. With the force step-up transmission device 140, the force to be transmitted by the force transmission device 110 can be stepped up, for example, variably stepped up. In another embodiment, the two force transmission parts 120 and 130 are coupled to each other via a force bridging device 150. Here, the second force transmission part 130 that is close to the engagement fitting is directly coupled to the force bridging device 150. The first force transmission part 120 that is distant from the engagement fitting is indirectly coupled to the force bridging device 150. The indirect coupling is effected via the force step-up transmission device 140, more precisely a step-up transmission unit which is attached to the first force transmission part 120, wherein the force bridging device 150 is coupled to the force step-up transmission device 140. The force bridging unit 150 is designed as control cable 151—or generally as cable pull. Here, the control cable 151 comprises a wire 152, which is coupled to an end to the second force transmission part 130 and on the other end to the force step-up transmission device 140. In an embodiment, the first force transmission part 120 is rotatably mounted about a first rotation axis 160. Here, the rotation axis 160 has a rotation-symmetrical cross section, for example, an approximately circular cross section. In an embodiment, the first force transmission unit 120 is configured as lever unit or pivot lever 121. The pivot lever 121 comprises two lever arms 122 and 123. The longer, first lever arm 122 is designed for actuation as handle element. The second lever arm 123 is designed for receiving the force step-up transmission device 140.

In an embodiment, the second force transmission part 130 is likewise configured as a lever unit or a rotatable pivot lever unit 131. The pivot lever 131 is configured as eccentric. Here, the pivot lever 131 comprises a mounting 132 for the wire 152. In addition, the pivot lever 131 comprises a drum or winding portion 133, about which the wire 152 can be wound.

In another embodiment, the force step-up transmission device 140 comprises a step-up transmission unit, which in this case is likewise configured as a lever unit or a pivot lever 141. The pivot lever 141 is rotatably arranged about a third rotation axis 180, which is arranged locationally fixed on the lever arm 123, eccentrically to the first rotation axis 160. The pivot lever 141 is thus rotatably about the first rotation axis 160 and about the third rotation axis 180. In order to control the rotation of the pivot lever 141, control elements 190 are provided, in an embodiment. These form a control curve with stop surfaces for the lever arm 141, which is thus configured as pivot cam. The control elements 190 comprise a first stop 191. The first stop 191 is arranged on the lever arm 123 and is in constant contact with the cam. Both have a suitable contour for sliding along the cam on the stop 191. Furthermore, the control elements 190 comprise a second stop 192, which limits a pivot movement of the first force transmission part 120. In addition, the control elements 190 comprise a guide stop 193. Between the stop 192 and the guide stop 193, a gap is provided into which the cam projects. Upon a pivot movement, the cam strikes the guide stop 193, is rotated and then slides with an outer contour along the corresponding outer contour of the guide stop 193, as is more clearly evident in FIG. 2b.

FIG. 2b schematically shows the adjusting device 100 in another position. The position shown here corresponds to a position approximately in the region of the complete decoupling of the engagement fitting unit, i.e. approximately a position in the force-distance diagram according to FIG. 1 at 20°. Compared with FIG. 2a, the pivot lever 121 is rotated by 20°. The cam, which initially still rested against the stop 191 and thus is not rotated relative to the pivot lever 121, has struck the guide stop 193, as a result of which the latter has performed a relative rotation to the lever arm 121. The superimposition of the two rotations is transmitted to the second force transmission part 130 via the control cable 151, as a result of which the entire pivot movement is transmitted to the force transmission part 130. Here, on commencement of the pivot movement of the pivot lever 141, an accelerated rotating of the pivot lever 131 takes place, as a result of which a decoupling timing is reached more quickly. Because of the additional relative movement of the pivot lever 141, a higher torque is required. As soon as the relative movement stops, here, when the cam slides along the guide stop 193, a smaller force is required. This force decline D is noticeable to the operator. It indicates to the operator that adjusting the backrest is now possible without problem. By way of the adjustment of the lever arms and the control elements 190, the force-distance characteristic of the adjusting device 100 can be adjusted. This becomes clearer by means of FIGS. 3 and 4.

Figure 3:
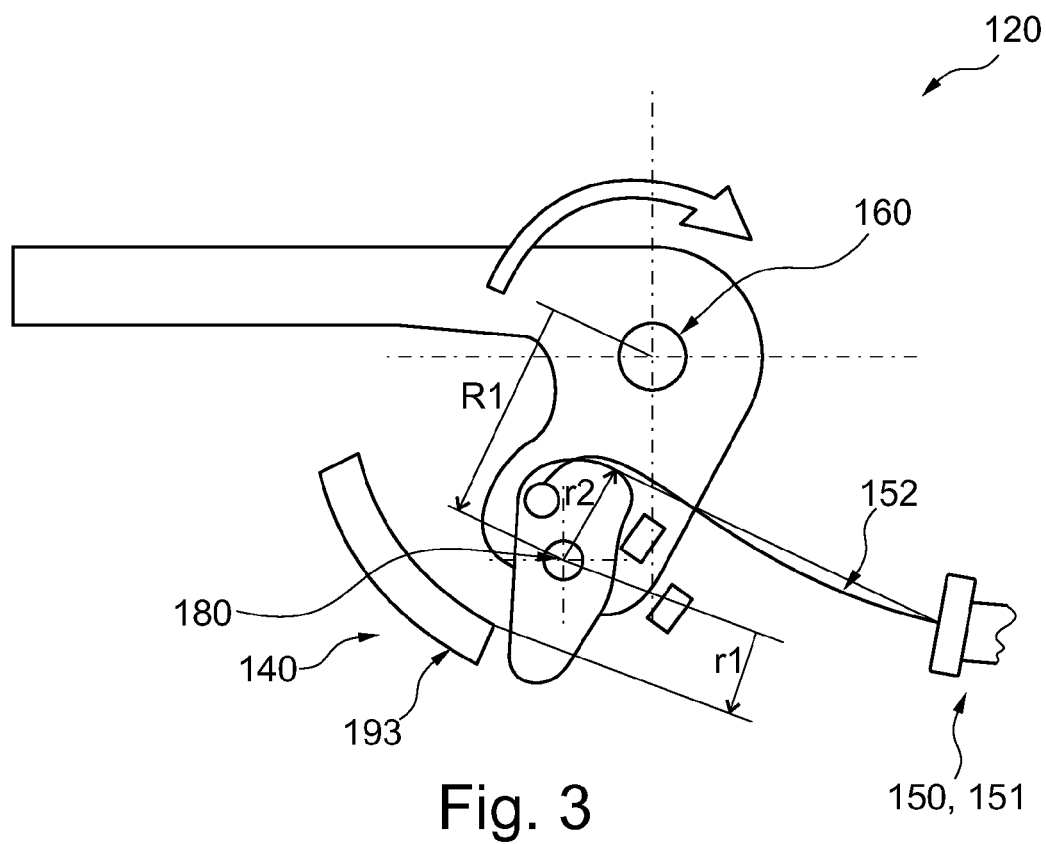
FIG. 3 illustrates a lever ratio of the force transmission device that is distant from the engagement fitting with force step-up transmission device of FIGS. 2a and 2b movably arranged thereon.

FIG. 3 schematically shows a lever ratio of the force transmission part 120 that is distant from the engagement fitting with force step-up transmission device 140 movably arranged thereon. The Figure is a detail from FIG. 2a. The distance of the first rotation axis 160 to the rotation axis 180 amounts to R1. The lever arm of the pivot lever 141, i.e. the distance r2 from the third rotation axis 180 to the outer contour of the pivot lever 141, amounts to r2. The distance r1 on the third rotation axis 180 to the outer contour of the guide stop 193 or the control curve amounts to r1.

Figure 4:
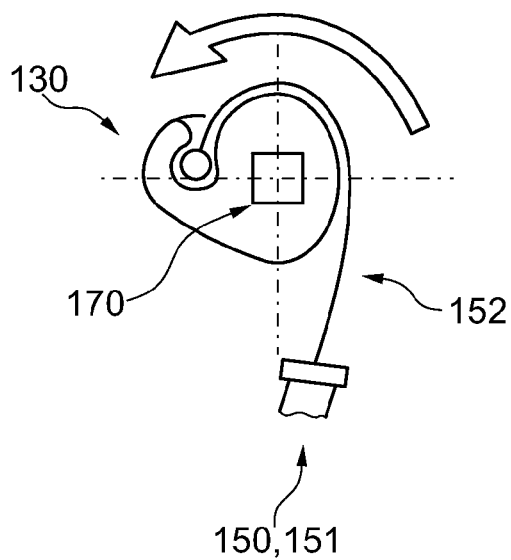
FIG. 4 illustrates a lever ratio of a force transmission device that is close to the engagement fitting of FIGS. 2a and 2b.

FIG. 4 schematically shows a lever ratio of the force transmission part 130 that is close to the engagement fitting. The figure is a detail from FIG. 2. The distance r2 of the second rotation axis 170 to an outer contour of the pivot lever 131 amounts to R2. Here, the distance is measured from the second rotation axis 170 as far as to the outer contour, against which the wire 152 happens to hug the outer contour.

By way of the parameters R1, R2, r1 and r2, a desired characteristic of the adjusting device 100 can be adjusted. Here, a torque of the first force transmission part 120 can be fixed in relation to the desired torque on the second force transmission part 130. Here, the sum of the distances r1 and r2 is set relative to the distance r1. To this end, the distance R1 is set relative to the distance R2. In order to fix the torque on the first force transmission part 120, the desired torque is multiplied with the corresponding ratios.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An adjusting device for adjusting a motor vehicle seat, the adjusting device comprising:
   an engagement fitting unit;
   a force transmission device configured to transmit a force for locking and unlocking the engagement fitting unit, the force transmission device having a first lever member rotatable about a first lever axis and a second member remote from the first lever member and rotatable about a second axis;
   a force step-up transmission device operably coupled to the first lever member and configured to step up the force transmitted by the force transmission device, the force step-up transmission device configured as a control cam rotatably mounted on the first lever member about a cam axis and further configured to variably step up the force transmitted by the force transmission device; and
   a flexible control cable interconnecting the force step-up transmission device and the second member such that the second member rotates about the second axis in response to rotation of the first lever member about the first lever axis.

2. The adjusting device according to claim 1, wherein the adjusting device is a discontinuous adjusting device for adjusting a backrest position of the motor vehicle seat.

3. The adjusting device according to claim 1, wherein the adjusting device is a remotely controlled adjusting device.

4. The adjusting device according to claim 1, wherein the adjusting device comprises a force bridging device configured as the control cable to transmit a remotely exerted force from a distant part of the force transmission device to a part that is close to the engagement fitting of the force transmission device.

5. The adjusting device according to claim 1, wherein a force bridging device configured as the control cable is coupled to the force step-up transmission device coupled to the force transmission device.

6. The adjusting device according to claim 1, wherein the force step-up transmission device comprises control elements that control a movement of the force transmission device and/or of the force step-up transmission device.

7. The adjusting device according to claim 6, wherein the control cam and the control elements form a control curve for the control cam, along which the control cam can be guided.

8. The adjusting device according to claim 1, wherein the cam axis is arranged eccentrically to the first lever axis of the force transmission device.

9. The adjusting device according to claim 1, wherein a part of the force transmission device that is close to the engagement fitting unit comprises the first lever member that is rotatable about the first lever axis, with which the force can be transmitted to the engagement fitting unit.

10. A motor vehicle seat with a backrest adjustable relative to a seat part, the motor vehicle seat having an adjusting device for adjusting the backrest, the adjusting device comprising:
    an engagement fitting unit;
    a force transmission device configured to transmit a force for locking and unlocking the engagement fitting unit, the force transmission device having a first lever member rotatable about a first lever axis and a second member remote from the first lever member and rotatable about a second axis;
    a force step-up transmission device operably coupled to the first lever member and configured to step up the force transmitted by the force transmission device, the force step-up transmission device configured as a control cam rotatably mounted on the first lever member about a cam axis and further configured to variably step up the force transmitted by the force transmission device; and
    a flexible control cable interconnecting the force step-up transmission device and the second member such that the second member rotates about the second axis in response to rotation of the first lever member about the first lever axis.

11. A motor vehicle with a seat unit for a vehicle occupant, wherein the seat unit has a backrest adjustable relative to a seat part and an adjusting device for adjusting the backrest, the adjusting device comprising:

an engagement fitting unit;

a force transmission device configured to transmit a force for locking and unlocking the engagement fitting unit, the force transmission device having a first lever member rotatable about a first lever axis and a second member remote from the first lever member and rotatable about a second axis;

a force step-up transmission device operably coupled to the first lever member and configured to step up the force transmitted by the force transmission device, the force step-up transmission device configured as a control cam rotatably mounted on the first lever member about a cam axis and further configured to variably step up the force transmitted by the force transmission device; and a flexible control cable interconnecting the force step-up transmission device and the second member such that the second member rotates about the second axis in response to rotation of the first lever member about the first lever axis.

12. The motor vehicle according to claim 11, wherein the motor vehicle is a passenger motor vehicle.

13. A method for adjusting a motor vehicle seat using an adjusting device, the method comprising the steps of:

transmitting, to an engagement fitting unit, a force for locking and unlocking the engagement fitting unit of the adjusting device with a force transmission device, the force transmission device having a first lever member rotatable about a first lever axis and a second member remote from the first lever member and rotatable about a second axis; and variably stepping up the force during the transmitting with a force step-up transmission device operably coupled to the first lever member and configured to step up the force transmitted by the force transmission device, the force step-up transmission device configured as a control cam rotatably mounted on the first lever member about a cam axis, wherein a flexible control cable interconnects the force step-up transmission device and the second member such that the second member rotates about the second axis in response to rotation of the first lever member about the first lever axis.

14. The method according to claim 13, wherein the adjusting device is a discontinuous adjusting device and the method results in adjusting a backrest position of the motor vehicle seat.

15. The method according to claim 13, wherein the stepping up at least partially comprises a degressive stepping-up.

\* \* \* \* \*